Dec. 22, 1953 R. V. MORAN 2,663,584
JOINT
Filed Feb. 11, 1949 2 Sheets-Sheet 1

Inventor
RALPH VICTOR MORAN.

By Shoemaker & Mattare
ATTORNEYS

Dec. 22, 1953   R. V. MORAN   2,663,584
JOINT
Filed Feb. 11, 1949   2 Sheets-Sheet 2
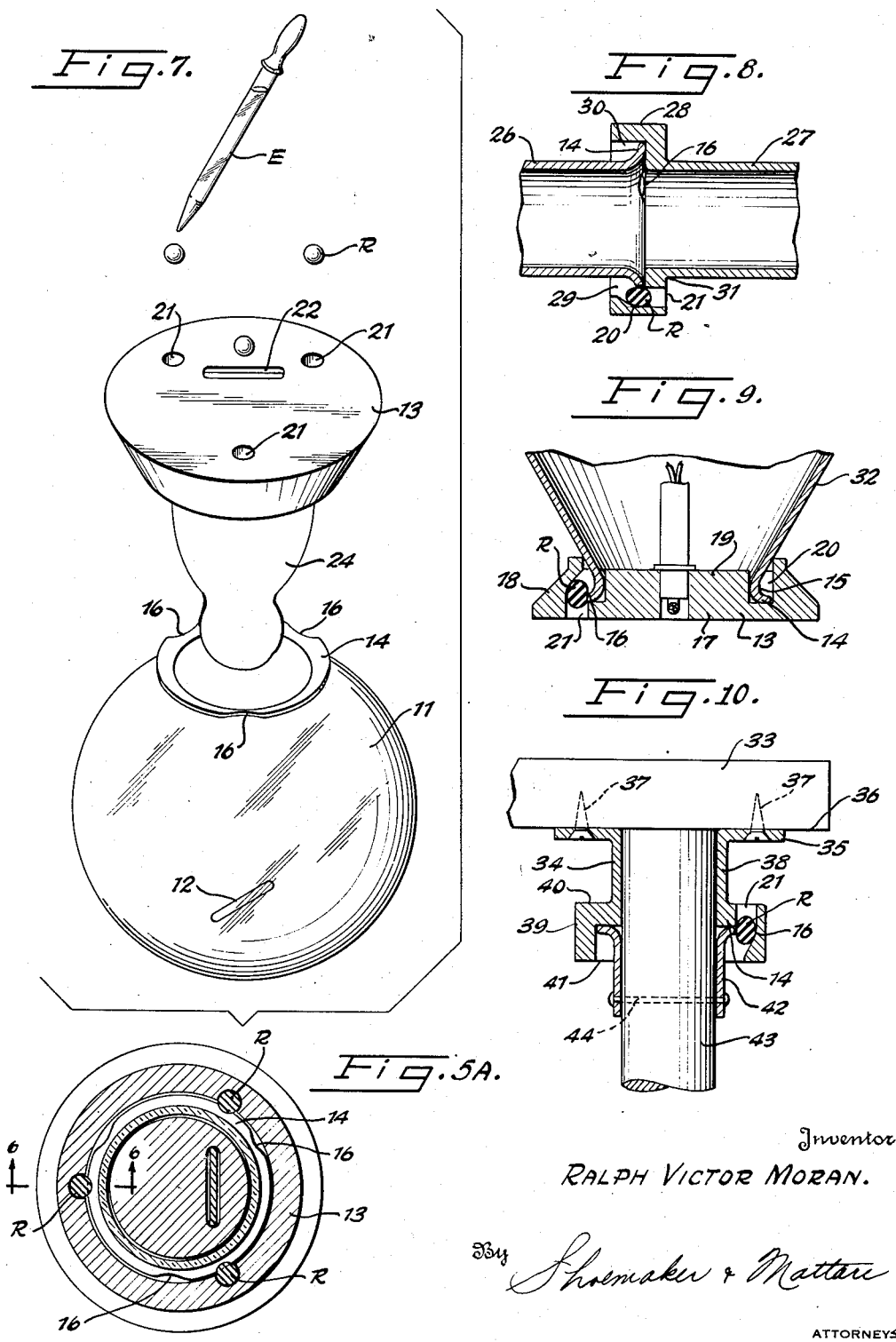
Inventor
RALPH VICTOR MORAN.
By Shoemaker & Mattare
ATTORNEYS Patented Dec. 22, 1953

2,663,584

UNITED STATES PATENT OFFICE 2,663,584

JOINT

Ralph V. Moran, Bradford, Pa.

Application February 11, 1949, Serial No. 75,910

4 Claims. (Cl. 287—1)

My invention relates to joints. The invention is more particularly directed to separable or detachable joints or connections between two elements and the said elements may be fabricated from the same or different materials.

Various types of joints or connections for detachably or otherwise securing together of two elements, regardless of what they may be, are well known to those in the particular arts wherein the joints or connections are utilized. For instance, where a glass globe or the like is united with a base or the like such as in my Patent 2,336,185, issued December 7, 1943, screws are provided for connecting—detachably connecting, the base of the coin bank in my said patent with the glass globe. A similar connection or joint is utilized for globes that enclose one or more electric lamps and where the globe is provided with a circular or other flange which is positioned in a socketed fixture, the latter having usually three screws in that fixture that engage in the annular channel provided by the flange for securing the globe to the electric fixture.

Other types of joints, such as bayonet joints, key-hole slot joints and various cam joints have all been utilized. These joints are quite satisfactory but some of them are complicated and expensive to fabricate and assemble. Where a frangible element such as the glass or plastic globe shown in my said patent is secured to a base and the base is of a different material than the globe, the tightening of the screws to secure the base to the globe or vice versa in some instances results in breakage of the globe and this is true with regard to such detachable connections wherein screws or the like are utilized. In other words, with the present screw connections, if the screws are unduly tightened against a frangible element, the latter would crack or break.

I have provided a very simple, relatively inexpensive and unique detachable joint or connection between two elements or articles, regardless of what the elements or articles are, and the joint or connection being such that when two frangible elements are detachably connected together, or one frangible element connected with a non-frangible element, breakage of the frangible elements is overcome and the joint or connection that results is what may be termed a more or less resilient one to the extent that the connecting element or elements are elastic and resilient.

Moreover, I have provided a unique joint or connection utilizing resilient balls or similar resilient and elastic articles which serve as a direct connecting means or medium between the two elements, whatever they may be, that are to be detachably secured or connected together. The connecting or joining together of the two elements is by the means of the resilient or elastic rubber or other type balls or the like which, prior to forming the joint or connection, are wetted or lubricated with a volatile liquid such as water or other volatile substance and are distorted and compressed between the two elements that are to be detachably connected or secured together, and wherein the wetting or lubrication of the balls allows the connection to be effected by a simple turning movement of one of the elements relative to the other and thereby distorting the balls and effecting a firm gripping of the two elements together when the said balls or the like become dry. When the elements are to be disconnected or disassociated from each other, the said balls or the like are again wetted and one of the elements turned with respect to or relative to the other.

The wetting or lubrication of the resilient or elastic balls or similar elements or articles is most important in that, at the time of joining or connecting the two elements together, the wetted balls allow for slippage ino a confined area or space where they are distorted and firmly grip the two elements together when the balls are dried. Thus, to remove one element from the other or disconnect the two, the balls are again wetted or lubricated and this allows for a difference of coefficient of friction between the balls and the two elements so that the two elements can be brought to a proper relationship for the removal of the balls and the two elements disassociated or disconnected from each other. Stated another way, the balls that are lubricated by the volatile liquid or other similar substance enable the joint to be readily effected and the elements to be disconnected, if desired, but the gripping or joining action of the balls with the two elements is effective, of course, when the volatile liquid or other substance has dried.

With the aforementioned in mind, it is an object of my invention to provide a relatively simple and inexpensive joint or connection between two elements.

Another object of my invention is to provide a joint or connection between two elements which is effected by wetted or lubricated resilient and elastic balls or the like.

Another object of my invention is to provide a joint or connection between different elements or articles of manufacture wherein the two elements or articles that are to be jointed together are of similar or different materials.

Another object of my invention is to provide a joint or connection between two articles or elements wherein one of the articles or elements is provided with an outwardly extending flange and thus forming a channel therein which is inserted in a base or other recessed coupling and a plurality of wetted resilient or elastic balls or the like are initially inserted between the two elements or articles in the said channel and one of the elements or articles turned with respect to the other to effect a distortion of the elastic and resilient balls or the like and, when dried, effect a firm union or joint connection between the elements or articles.

Another object of my invention is to provide a joint or connection between two articles or elements by means of balls that are wetted and allowed to dry to effect the connection and when the articles or elements are to be disconnected, the balls or the like again wetting for disassociation of the articles or elements from each other.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 5A is a view similar to Fig. 5 but showing the base and globe secured or connected together by means of the balls.

Fig. 7 is an exploded perspective view of the bank shown in Fig. 1;

Fig. 8 is a fragmentary longitudinal cross sectional view of a modification showing a pipe joint or connection embodying my invention therein;

Fig. 9 is a fragmentary view of an electric lamp embodying my invention therein; and Fig. 10 is a side elevational view partly in section showing my invention applied to a connection or joint for a leg to a table.

The invention will be more readily understood by referring to the drawings in detail wherein like reference numerals in the several figures of the drawings all denote the same parts.

Figure 1:
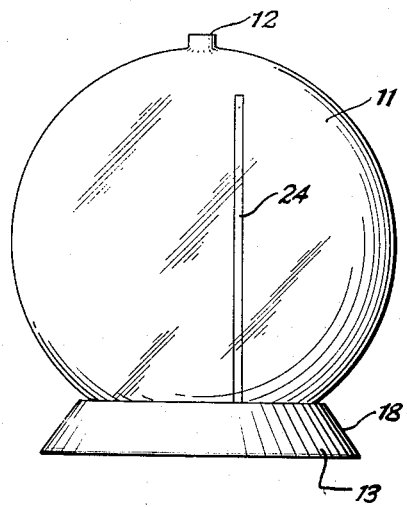
Fig. 1 is a side elevation of my invention as applied to a money bank.

The invention will be more readily understood by referring to the drawings in detail wherein in Figs. 1 through 7, I have shown my invention for illustrative purposes as being applied to a money bank. In the said views, 1 through 7, the money bank consists of a transparent glass or plastic globe or bubble 11 having in the top portion thereof an elongated coin-receiving opening 12 and a base 13 which may be of wood, plastic, or other suitable material.

The bottom portion of the globe, opposite that wherein the coin-receiving slot is formed, has a flange 14 thereon and integral therewith and which flange is substantially circular in outline and provides an annular channel or passageway 15. At spaced points, the flange 14 has notches 16 therein and, while three such notches have been shown, it is understood that any suitable number of notches may be utilized.

The base of the bank 13 is usually of some opaque material such as wood, plastic, metal or the like and is generally circular in outline, the bottom portion 17 of which is substantially flat and the side walls 18 thereof preferably slightly taper upwardly. The upper face portion 19 of the base is annularly grooved as at 20 and which groove corresponds with the outline and diameter of the outwardly extending flange 14 at the bottom of the globular bank 11 so that the flange may be received in the said annular groove. At spaced points, which must be in registry with the notches 16 at the bottom of the globular element 11, the base has openings 21 therein, which openings communicate with the annular groove 20 as clearly seen in Figs. 4 and 6.

Figure 2:
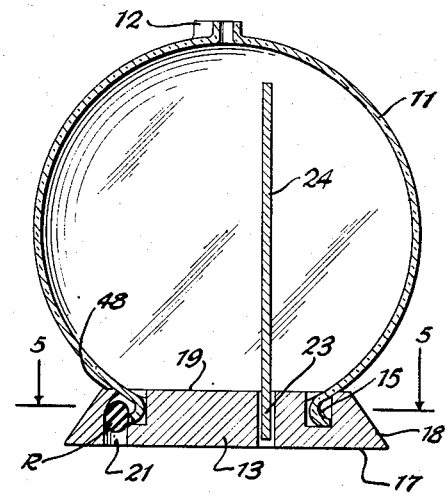
Fig. 2 is a vertical sectional view of the bank shown in Fig. 1.
Figure 3:
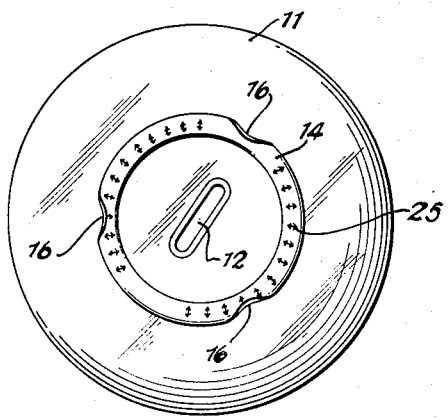
Fig. 3 is a bottom plan view of the globe of the bank and showing the flange at the bottom thereof.

An elongated slot 22 is also provided in the base and this slot receives therein a tongue 23 that is integral with an upstanding substantially flat panel or ornament 24 which, when the base element and the globular element comprising the bank are assembled, stands upright within the globe as seen in Figs. 1 and 2 and in my said patent.

In Fig. 1, wherein the bank is assembled and the joint of the base to the globe is effected, it will be noted that the aforesaid upstanding ornament 24 is substantially parallel with the elongated coin-receiving opening for a purpose described hereinafter.

If desired, the inner portion of the outwardly extending flange 14 may be roughened or embossed as denoted at 25 in order to induce friction between the same and the elastic and resilient rubber or other type balls as more fully described hereinafter.

In Fig. 8, the invention is disclosed in connection with the joining together of two pipe or tubular elements 26 and 27. The pipe or tubular element 26 is flanged at 14 at its end in substantially the same manner that the bottom of the globular element of the bank is flanged and is similarly provided with a plurality of notches 16. The other element of the tubular pipe or conduit 27 has its end 28 enlarged and is hollow as at 29 providing the space 30 wherein the flanged end of the tubular element 26 is inserted and the rear end of the enlargement 31 is closed except for the plurality of spaced openings 21 therein which openings are the same as the openings 21 in the hereinbefore described bank base. It is understood, of course, that the plurality of notches 16 provided in the flange 14 of the tubular element 26 are adapted to register with the openings 21 in the enlarged end portion 28 of the tubular element 27 for the purpose of inserting the rubber resilient and elastic balls or the like therein.

In Fig. 9, my invention is disclosed in connection with an electric table lamp or similar article provided with a porcelain, glass or other frangible body, preferably hollow body 32, at the bottom of which the flange 14 is formed which creates the annular channel 15 as in the money bank and which flanged bottom portion of the electric lamp is disposed in the annular groove 20 in a base 13 such as that shown in connection with the money bank in the other figures of the drawings. The flanged portion of the lamp body is also provided with a plurality of spaced notches 16 and the base portion is likewise provided with the plurality of spaced openings 21 therein which register with the notched portions for insertion thereinto of the rubber, elastic and resilient balls and the like.

In Fig. 10 of the drawings, I have shown my invention as applied to the joining of a table leg to a table top but, of course, the joint could be used for other articles of furniture or any use whatsoever. One corner of the table top 33 is shown and on the bottom of which there is a fitting or coupling element 34 having at one end thereof an outwardly extending circular flange 35 which is secured to the underside of the table top 36 by means of suitable screws 37 or the like. The fitting is provided with a hollow socket or sleeve like portion 38, the end of which 39 is enlarged somewhat similar to the enlarged end 28 of the pipe connection shown in Fig. 8. The inner enlarged end portion 40 is closed and is provided with spaced openings 21, similar to the other figures of the drawings, and the outer end 41 of the enlargement is open to receive therein the flanged end 14 of a sleeve 42, which sleeve may be applied to the table leg 43 and held thereon by a suitable securing means 44 or, of course, the end of the table leg, which is shown in the drawings as being of wood, may be metal and the flanged end 14 provided with the spaced notches 16 can be integral therewith.

Figure 5:
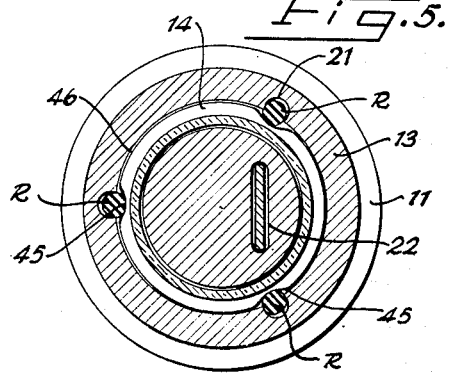
Fig. 5 is a view taken substantially on the line 5—5 of Fig. 2 looking in the direction of the arrows with the base and globe engaged but not secured or connected together.

The aforesaid rubber or other elastic and resilient balls or the like are denoted at R in all of the figures of the drawings. The joint or connection of the aforesaid elements or articles together is effected by means of the rubber or other resilient and elastic balls or the like being first wetted or lubricated with water or any other suitable volatile liquid or compound, which wetting or lubrication may be accomplished by the use of an eye dropper E. The assembly of the two elements together to form a joint or connection between the same will be more readily understood by referring to Fig. 7 which shows the two elements and the balls ready to be assembled to form the joint. The rubber or other elastic and resilient balls or the like are first wetted with water or other volatile solution or compound by means of using the eye dropper E to place a small amount, say a drop, of water on each of the balls and, with the base portion of the elements or the enlarged ends as referred to in several of the modifications, turned over as seen in Fig. 7, the two elements are brought together with the plurality of notches 16 in one of the elements in registry with the plurality of spaced openings 21 in the other element and, when this is accomplished, the wetted or lubricated balls are placed into the spaced openings 21 and they are gripped partially in that opening and in the respective notches, as at 45 in Fig. 5. The balls or the like can be pushed in the openings with a pencil or other device until they are in that position; namely, pressed in the walls of the openings 21 and engaging the notched portions of the flange. Then all that is necessary in order to effect the joining together of the two elements or articles, whatever they may be, is that one of the elements, the base element having the openings therein, be gripped and held while the other element is turned and, as the rubber or like balls are wetted or lubricated, they will allow for slippage and movement of the notched portions of the flange away from the balls and bring the unnotched spaced edge portions of the flange into contact with the balls and compress or distort the balls into firm gripping and holding condition as shown in Figs. 5A and 6 of the drawings and effect a firm gripping action between the two elements when the wetting or lubricating agent or medium on the balls has dried.

Figure 6:
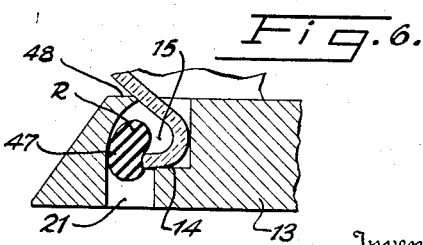
Fig. 6 is a sectional view taken substantially on the line 6—6 of Fig. 5A looking in the direction of the arrows.

With the rubber or like balls distorted as shown at 47 in Fig. 6, it will thus be seen that a firm gripping action is effected between the two elements that are joined together and these two elements will remain so joined indefinitely until it is desired to separate the two. When separation of the two elements, that have previously been joined together by the wetted balls, is desired, then all that is necessary is to place a drop of water or other volatile solution or compound on each of the distorted balls in the openings and this is accomplished by use of an eye dropper or other device, means or manner, thus again allowing a sliding or slipping action between the balls and the flange 14 of the globe 11 and, by holding the base 13 and turning the globe or other element, the balls are brought back to a position where the plurality of notches 16 again register with the plurality of openings 21 and, by a wiggling or canting action of one of the elements with respect to the other, they can be separated and the balls entirely removed.

Figure 4:
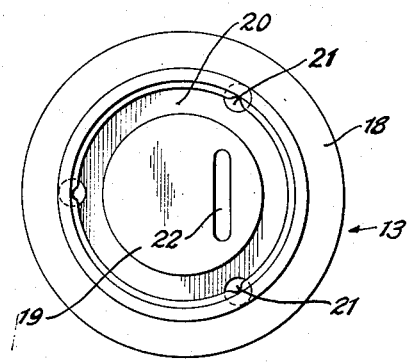
Fig. 4 is a top plan of the base of the bank showing the annular groove and the openings therein.

It is, of course, understood that, prior to perfecting the connection of the two elements together by means of the resilient and elastic rubber or other balls, the same have been inserted in the openings 21 and register with and engage the notches 16 and that, by turning the globe or similar element relative to the stationary element, the balls are partially forced into the restricted channel portion 15 formed in the bottom of the globe and which channel is partially closed at its top by the inturned upper portion 48 which overlies a portion of the said annular channel 20, and, of course, the spaced openings 21; see Figs. 4 and 6.

I have mentioned that the balls are of rubber and, as shown, the exterior surface of the balls is relatively smooth but this exterior surface may be faceted, roughened or grooved in any manner as desired in order to induce or increase friction and retention of the wetting or lubricating agent. Of course, any suitable resilient plastic may be used just so long as it has the inherent characteristics to effect a firm gripping and joining of two elements, whatever they may be, together in accordance with the teachings as disclosed herein.

While I have shown a plurality of notches 16 and a plurality of openings 21 in the respective elements to be joined together, of course, one such notch and one such opening may be utilized to effect the securing together of two elements.

Also, while I have shown rubber or other resilient and elastic balls that are substantially round, the same need not be perfectly round and may be ovate or of other form or outline and shape.

It is understood that the basic and specific features of my invention as shown in Figs. 1 through 7, both inclusive, are carried out in the modifications shown in Figs. 8, 9 and 10 of the drawings.

In Fig. 6, the balls R are in the openings 21 and distorted and compressed as shown, and the globe element and the base are secured or connected together; whereas, in Fig. 2, the balls R are in the openings 21 and engaging in the notches 16, not compressed or distorted. Thus, by holding the base element, Fig. 2, and turning the globe 11 as in this figure to the position shown in Fig. 6, the two said elements are secured or connected together.

The balls may be wetted prior to insertion in the openings when the joining of the two elements together is to be effected or the balls may be wetted after insertion in the openings and, obviously, some of the water or other wetting agent may also wet a portion of the flange of the globe or other flanged element. To disconnect the two elements, the balls must be wetted while they are in the openings.

I claim:

1. A joint between two elements, one of the elements having an annular groove therein with a plurality of spaced openings communicating with the groove, elastic resilient members in the spaced openings and extending into the groove, the other element having a flange thereon with the flange disposed in the groove, the resilient members being compressed and distorted between and frictionally engaging the flange and a wall portion of the groove to effect the joint therebetween.

2. A joint as set forth in claim 1 wherein the flange has a plurality of notches therein of the same number as the openings and the resilient members are rubber balls.

3. The method of joining two elements together, one of the elements having an annular groove, the groove having an opening communicating therewith and the other element having a flange thereon, comprising wetting an elastic resilient member, inserting the member in the opening communicating with the annular groove, inserting the flange into the groove and engaging the member in the opening by the flange, turning one element relative to the other to compress and distort the wetted member between the flange and the groove and allowing the wetted member to dry, thereby effecting a firm joint between the two elements.

4. The method of breaking a joint between two elements, one of the elements having an annular groove, the groove having an opening communicating therewith and the other element having a flange thereon and an elastic resilient member, the flange being within the groove and compressing and distorting the elastic member within the groove, comprising wetting the elastic member, turning one element relative to the other, moving the elastic member into the opening and releasing the elastic member from its engagement by the flange whereupon the two elements may be separated.

RALPH V. MORAN.

References Cited in the file of this patent

UNITED STATES PATENTS

| Number | Name | Date |
| --- | --- | --- |
| 1,425,616 | Tarbox | Aug. 15, 1922 |
| 2,063,967 | Whittam | Dec. 15, 1936 |
| 2,215,134 | Rehnberg | Sept. 17, 1940 |
| 2,219,266 | Hirsch | Oct. 22, 1940 |
| 2,365,598 | Rubin | Dec. 19, 1944 |
| 2,435,612 | Snyder | Feb. 10, 1948 |